(12) United States Patent
Powell

(10) Patent No.: US 10,602,833 B2
(45) Date of Patent: Mar. 31, 2020

(54) CONVERTIBLE BRIEFCASE AND GARMENT CASE WITH ADJUSTABLE SADDLEBAG ATTACHMENT

(71) Applicant: Shawn Powell, Long Beach, CA (US)

(72) Inventor: Shawn Powell, Long Beach, CA (US)

( * ) Notice: Subject to any disclaimer, the term of this patent is extended or adjusted under 35 U.S.C. 154(b) by 0 days.

(21) Appl. No.: 16/293,579

(22) Filed: Mar. 5, 2019

(65) Prior Publication Data

US 2019/0269230 A1    Sep. 5, 2019

Related U.S. Application Data

(60) Provisional application No. 62/638,812, filed on Mar. 5, 2018.

(51) Int. Cl.
| | |
|---|---|
| *A45C 3/02* | (2006.01) |
| *A45F 4/02* | (2006.01) |
| *B62J 9/00* | (2020.01) |
| *A45C 13/30* | (2006.01) |
| *A45C 7/00* | (2006.01) |
| *A45C 13/02* | (2006.01) |

(52) U.S. Cl.
CPC .............. *A45F 4/02* (2013.01); *A45C 13/30* (2013.01); *B62J 9/00* (2013.01); *A45C 3/02* (2013.01); *A45C 7/0063* (2013.01); *A45C 13/02* (2013.01); *A45F 2004/023* (2013.01)

(58) Field of Classification Search
CPC .. B62J 9/00; A45F 4/02; A45C 7/0086; A45C 2003/005; A45C 7/0045; A45C 2013/306; A45C 2009/007; A45C 7/009
See application file for complete search history.

(56) References Cited

U.S. PATENT DOCUMENTS

| | | | | |
|---|---|---|---|---|
| 3,786,972 A | * | 1/1974 | Alley | B62J 9/00 224/417 |
| 3,830,348 A | * | 8/1974 | Ohyama | A45C 7/0077 190/107 |
| 3,937,374 A | * | 2/1976 | Hine, Jr. | B62J 9/00 224/430 |
| 4,081,061 A | * | 3/1978 | Tucker | A45C 3/00 190/108 |
| 4,258,869 A | * | 3/1981 | Hilgendorff | B62J 9/00 224/429 |
| 4,390,088 A | * | 6/1983 | Brenner | B62J 9/00 206/335 |

(Continued)

OTHER PUBLICATIONS

PCT/US19/20835, Written Opinion of the International Search Authority, dated Jul. 9, 2019.

*Primary Examiner* — Brian D Nash
(74) *Attorney, Agent, or Firm* — Risso I.P.

(57) ABSTRACT

A luggage assembly includes a first bag and a second bag, each bag having a rear side with a number of fasteners that engage the rear sides of the other bag to attach them together. The rear sides also have an open slot near the top end to receive a dual bag strap extending between the bags, such that the bags may be used as saddlebags. The bags may further include bag handles near the top end of the bags, and an assembly handle extending between the bag handles such that the luggage assembly may be conveniently carried as a single unit. The luggage assembly also includes an individual bag strap that may attach to the fasteners on the rear sides such that the bags may be used and carried individually.

10 Claims, 14 Drawing Sheets

(56) References Cited

U.S. PATENT DOCUMENTS

| | | | | |
|---|---|---|---|---|
| 4,402,439 A | * | 9/1983 | Brown | B62J 9/00 224/417 |
| 4,420,068 A | * | 12/1983 | Gerch | A45C 3/004 190/102 |
| 4,442,960 A | | 4/1984 | Vetter | |
| 4,491,258 A | * | 1/1985 | Jones | B62J 9/00 224/153 |
| 4,577,786 A | * | 3/1986 | Dowrick | B62J 9/00 224/417 |
| 4,580,706 A | * | 4/1986 | Jackson | B62J 9/00 224/417 |
| 4,609,084 A | * | 9/1986 | Thomas | A45C 9/00 190/110 |
| 4,662,548 A | * | 5/1987 | Jackson | B62J 9/00 220/9.3 |
| 4,934,571 A | * | 6/1990 | Shimazaki | B62J 9/00 190/124 |
| 5,050,713 A | * | 9/1991 | Lee | A45C 7/0086 150/110 |
| 5,062,717 A | | 11/1991 | Shockley | |
| 5,129,560 A | * | 7/1992 | Herman | A45F 3/00 224/153 |
| 5,186,290 A | * | 2/1993 | Takayama | A45C 7/0045 190/108 |
| 5,544,792 A | * | 8/1996 | Arnwine | A45C 7/0086 224/153 |
| 5,586,703 A | * | 12/1996 | Radar | A45F 3/04 224/148.2 |
| 5,603,441 A | * | 2/1997 | Easter | A45F 3/00 224/153 |
| 5,630,536 A | | 5/1997 | Bugnaski | |
| 5,890,639 A | * | 4/1999 | Hancock | A45C 3/00 224/42.11 |
| 5,947,241 A | * | 9/1999 | Rausch | A45C 13/00 150/111 |
| 7,568,600 B2 | * | 8/2009 | Godshaw | B62J 9/008 224/429 |
| 7,600,620 B2 | * | 10/2009 | Hammond | A45C 7/009 150/111 |
| 7,757,911 B2 | * | 7/2010 | Barker | A45C 3/14 224/153 |
| 8,152,037 B2 | * | 4/2012 | Sabbag | B25H 3/00 206/373 |
| 8,844,717 B1 | * | 9/2014 | Ross | B25H 3/00 182/129 |
| 2002/0096409 A1 | | 7/2002 | Roegner | |
| 2005/0194413 A1 | | 9/2005 | Baker | |
| 2007/0164068 A1 | | 7/2007 | Godshaw et al. | |
| 2010/0147918 A1 | | 6/2010 | Hensley et al. | |
| 2014/0048575 A1 | | 2/2014 | Kennedy-Sharpe | |
| 2015/0225032 A1 | * | 8/2015 | Sakai | B62J 7/04 224/430 |
| 2016/0257479 A1 | | 9/2016 | Seiders et al. | |

* cited by examiner

CONVERTIBLE BRIEFCASE AND GARMENT CASE WITH ADJUSTABLE SADDLEBAG ATTACHMENT

RELATED APPLICATIONS

This application claims priority to provisional application No. 62/638,812 filed Mar. 5, 2018 entitled "Convertible Briefcase And Garment Case With Adjustable Saddlebag Attachment."

BACKGROUND

Briefcases, garment bags and saddlebags are known in the art, as are backpacks and bags utilizing a single shoulder strap. While such apparatus can independently provide effective storage for different types of items (i.e., briefcases for office supplies, garment bags for clothing, etc.), they are generally incapable of holding multiple different types of items in the same apparatus, and are not well suited for a variety of carrying techniques. For example, saddlebags are not well suited for carrying on a user's back, and briefcases are not well suited for carrying or mounting in the manner saddlebags mount to motorcycles or similar transport.

For this reason various combination apparatus have been developed in the art including briefcases that double as overnight bags, and backpacks that include inside structures for holding laptop computers and other electronics, in addition to clothing. The drawback with these apparatus is frequently the various interior structures are in conflict and ill-suited for such hybrid uses. For example, a backpack with laptop computer storage, when overstuffed with clothing, may put undue pressure on the laptop or similar computing device, bending it and causing damage. Alternatively, liquids stored among toiletries may leak, causing damage to sensitive electronic equipment.

Hence, what is needed is a convertible briefcase and garment case including an adjustable saddlebag attachment, that provides storage capabilities for different types of items without the limitations of existing apparatus.

SUMMARY

The preferred embodiment of the apparatus is a luggage assembly including a first bag and a second bag, each bag having a front side, a rear side, and a pair of opposing sides. The rear sides of the first bag and the second bag have a number of fasteners that may engage such that the bags may be attached to one another. The rear sides of the bags also have an open slot near the top end sized to receive a strap. In this configuration, the first bag and the second bag may be separated and the luggage assembly used as saddlebags. Also in this configuration, the strap may attach to the rear side of the bags. The bags further include a carrying handle near the top end, and may further include a luggage assembly carrying handle extending between the bag carrying handles. In this configuration, the rear sides of the bags are preferably fastened together and the luggage assembly may be conveniently carried by the luggage assembly carrying handle. The luggage assembly also includes an individual bag strap that may attach to the fasteners on the rear sides. The individual bag strap is also preferably attachable to each of the bags such that the bags may be worn individually as backpacks.

The middle portion of the dual bag carrying strap may include a carrying handle to aid in gripping the strap, and the strap may be adjustable in length. The intermediate sides of the preferred embodiment may be pleated as to be collapsible, and the front side of the bags may be detachable from the intermediate sides for ease of loading the bags.

In a second embodiment, the apparatus is a baggage system for carrying items and includes a briefcase and a garment bag. Both bags have a back side with a number of saddle bag fasteners to attach a saddle bag strap, and the fasteners preferably extend along a length of the back side of both bags. The back sides further include a single bag carrying strap fastener that may be attached to a single bag carrying strap, and a pair of cover fasteners that may attach to a cover. The cover preferably attaches to the back sides of the bags to conceal the saddle bag fasteners, carrying strap fasteners, and cover fasteners for aesthetic purposes and to provide comfort to a user when wearing or using the bags. The back sides further include an elongated opening near the top of the back sides, the openings of which are sized such that the saddle bag strap may pass through the openings and extend between the briefcase and garment bag.

The position of the saddle bag fasteners along the length of the back sides of the bags allows the saddle bag strap to attach to different locations along the back sides such that the distance between the briefcase and garment bag may be adjusted when the briefcase and garment bag are attached to the saddle bag strap. The briefcase and the garment bag may further include parallel sides defining a width of the bags, and the single bag carrying strap may attach to the parallel sides so that the briefcase and garment bag may be carried separately. The briefcase and garment bag of the second embodiment include a bottom side that may have a number of carrying strap fasteners.

The single bag carrying strap of the second embodiment has a first end, a second end, and a middle part. The middle part includes a hardware that may attach to the briefcase and garment bag, and the first and second ends of the single bag carrying strap may attach to the carrying strap fasteners on the back or bottom side of the briefcase and garment bag. In this configuration, the briefcase and garment bag may be worn separately as a backpack.

In a third embodiment, the apparatus is a dual convertible bag assembly including a first bag and a second bag. Each bag has a rear side including a first set of fasteners, and the fasteners may engage so that the rear sides of the bags connect. The apparatus also includes a strap that may connect to the first set of fasteners. The first and second bags also have sides that span between the rear side, and the sides have a second set of fasteners that may connect to the strap. Because fasteners are on the rear and opposing sides of the bags, a user may adjust the point of connection between the strap and the bags. The apparatus also has a second strap that may connect to the first set of fasteners so that the second strap may attach near the top of the bags. The rear sides of the bags may also have an opening near the top of the rear sides that is large enough for the second strap to pass through. The third embodiment also includes a cover that may attach to the first set of fasteners on the rear sides of the bags.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
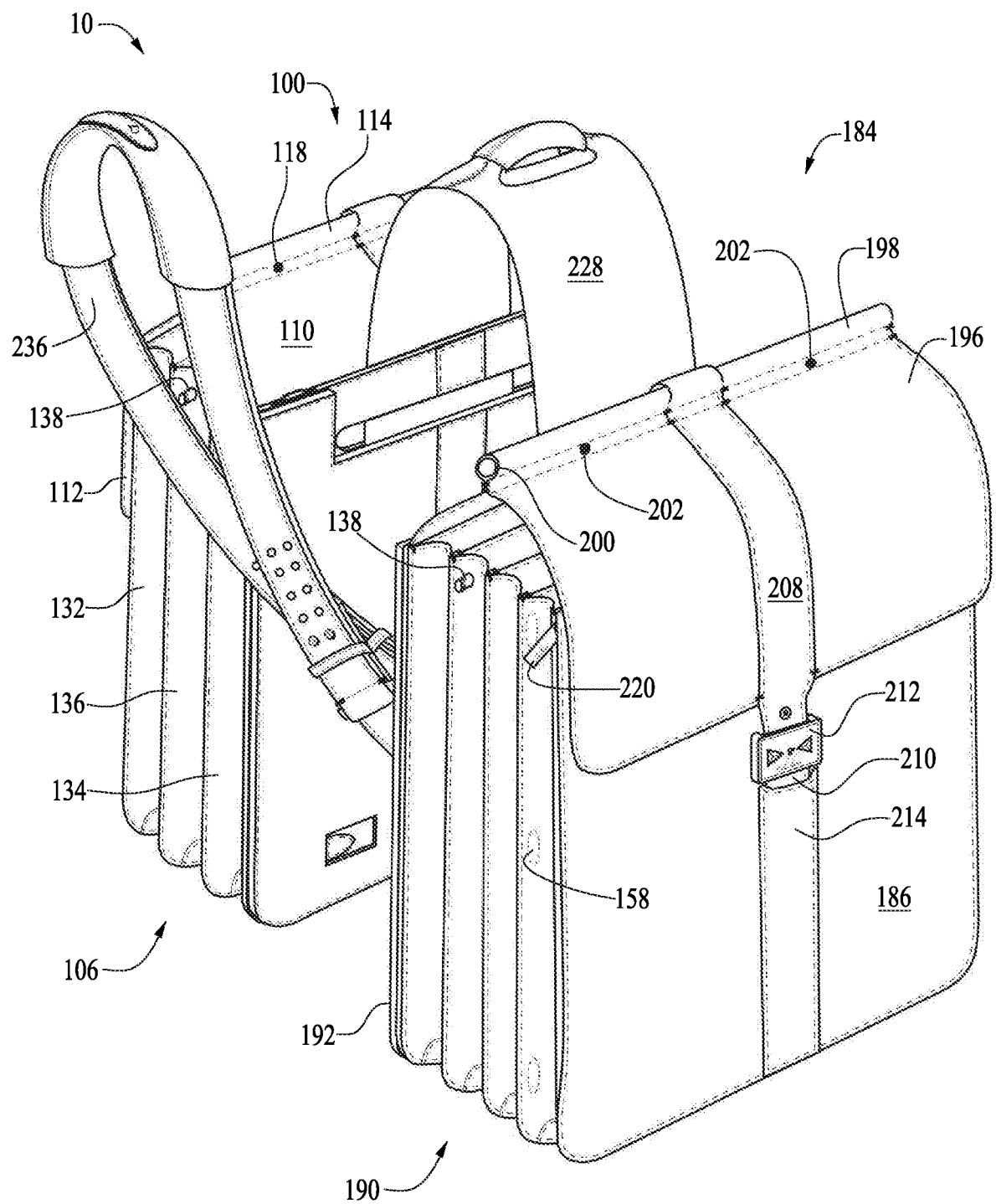
FIG. 1 illustrates a perspective view of a convertible briefcase and garment case apparatus with adjustable saddlebag attachment.

Referring to FIG. 1, a convertible briefcase and garment case with adjustable saddlebag attachment apparatus ("apparatus") 10 is shown. The apparatus 10 is generally configured such that a first container portion 100 is configured as a briefcase and can function as one saddlebag, while a second container portion 184 is configured as a garment bag and can function as a complimentary saddlebag. The first container portion 100 and the second container portion 184 are connected by a shoulder harness 228 allowing them to be suspended on either side of a user's shoulder (not shown), or over the seat of a motorcycle (not shown) or similar carrying mode. Importantly, using a series of features discussed in detail below, the first container portion 100 and the second container portion 184 can be attached directly to each other (i.e., omitting first rear cover 108, second rear cover 192), and alternatively can be used independently of each other, and when used independently, either may be worn in the manner of an over-the-shoulder bag or as a conventional backpack by virtue of a shoulder strap 236 that can be connected to the first container portion 100 and the second container portion 184 in a variety of configurations.

Figure 2:
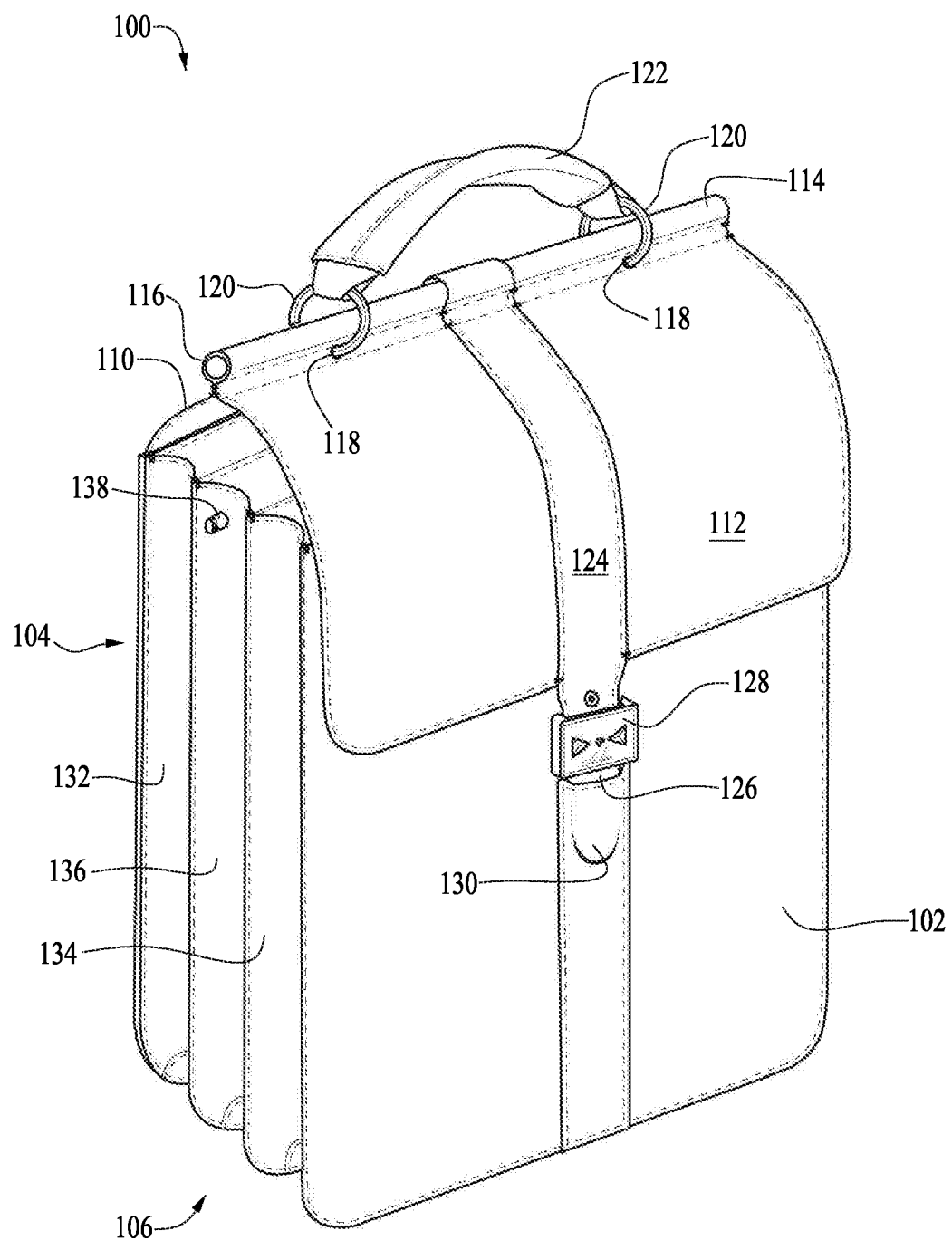
FIG. 2 illustrates a perspective view of a first container portion of the apparatus.

Referring to FIG. 2, the preferred embodiment of the first container portion 100 is shown. Configured as an expandable briefcase, the first container portion 100 includes a first front side 102 and a first back side 104 (FIG. 4) separated by an expandable first pleated section 106, and a first bottom side (not shown). In an alternate embodiment (not shown), the first front side 102 and first pleated section 106 are connected by a zipper closure (see FIG. 8) that allows the first front side 102 to be opened or partially opened, making it easier to access the interior. In the preferred embodiment, a first rear cover 108 (FIGS. 5A, 5B) is affixed to the first back side 104 to hide a plurality of hardware connections (discussed separately). The first rear cover 108 is used when the first container 100 is carried either by itself, or when the apparatus 10 is configured as saddlebags, or at any time when the first back side 104 would otherwise be visible or exposed. The first container portion 100 includes a first overlapping portion 110 comprising a first flap 112. The first overlapping portion 110 is configured for securing items stored inside the first container portion 100. The first overlapping portion 110 also comprises a first handle support 114 preferably disposed lengthwise along its apex. The first handle support 114 encloses a preferably substantially rigid first dowel 116 that imparts strength and resiliency to the first overlapping portion 110. Two first handle anchor holes 118 are formed below the first handle support 114 and accommodate a pair of first removable o-rings 120 that engage a removable first handle 122, which is preferably padded for user comfort.

Still referring to FIG. 2, a first decorative strap 124 extends over the first overlapping portion 110, including the first flap 112, from the first back side 104 to the first front side 102, and is preferably centered on the first container portion 100. The first decorative strap 124 includes a first tongue 126 that overhangs the first flap 112, and engages a first lock 128 located on the first front side 102. Below the first lock 128, an extension of the first decorative strap 124 includes a first pocket 130 for accommodating excess of the first tongue 126 when it engages the first lock 128. Thus, in addition to imparting an aesthetically pleasing appearance to the first container portion 100, the first decorative strap 124 also serves to secure the first overlapping portion 110 to the first front side 102. In various embodiments, the first lock 128 may be a traditional buckle, keyed lock, combination lock, or any other locking feature suitable for securing the first decorative strap 124. The first pocket 130 helps prevent the first tongue 126 of the first decorative strap 124 from curling away from the first front side 102 when locked in position.

As shown in the illustrated embodiment, the first pleated section 106 includes a rear pleat 132 adjacent the first back side 104, a front pleat 134 adjacent the first front side 102, with a center pleat 136 between them. A male portion guillotine connector 138 is preferably affixed near the top of the center pleat 136. The male portion guillotine connector 138 pairs with a female portion guillotine connector 140 on a shoulder strap 236 (FIG. 11) when the first container portion 100 is to be carried over a user's shoulder using another male portion guillotine connector 138 on the opposing side of the first pleated section 106. Although a guillotine-type connector is specified in the illustrated embodiment due to its ability to rotate, any connector allowing the first container portion 100 to rotate relative to the shoulder strap 236, while remaining securely affixed thereto is contemplated.

Figure 3:
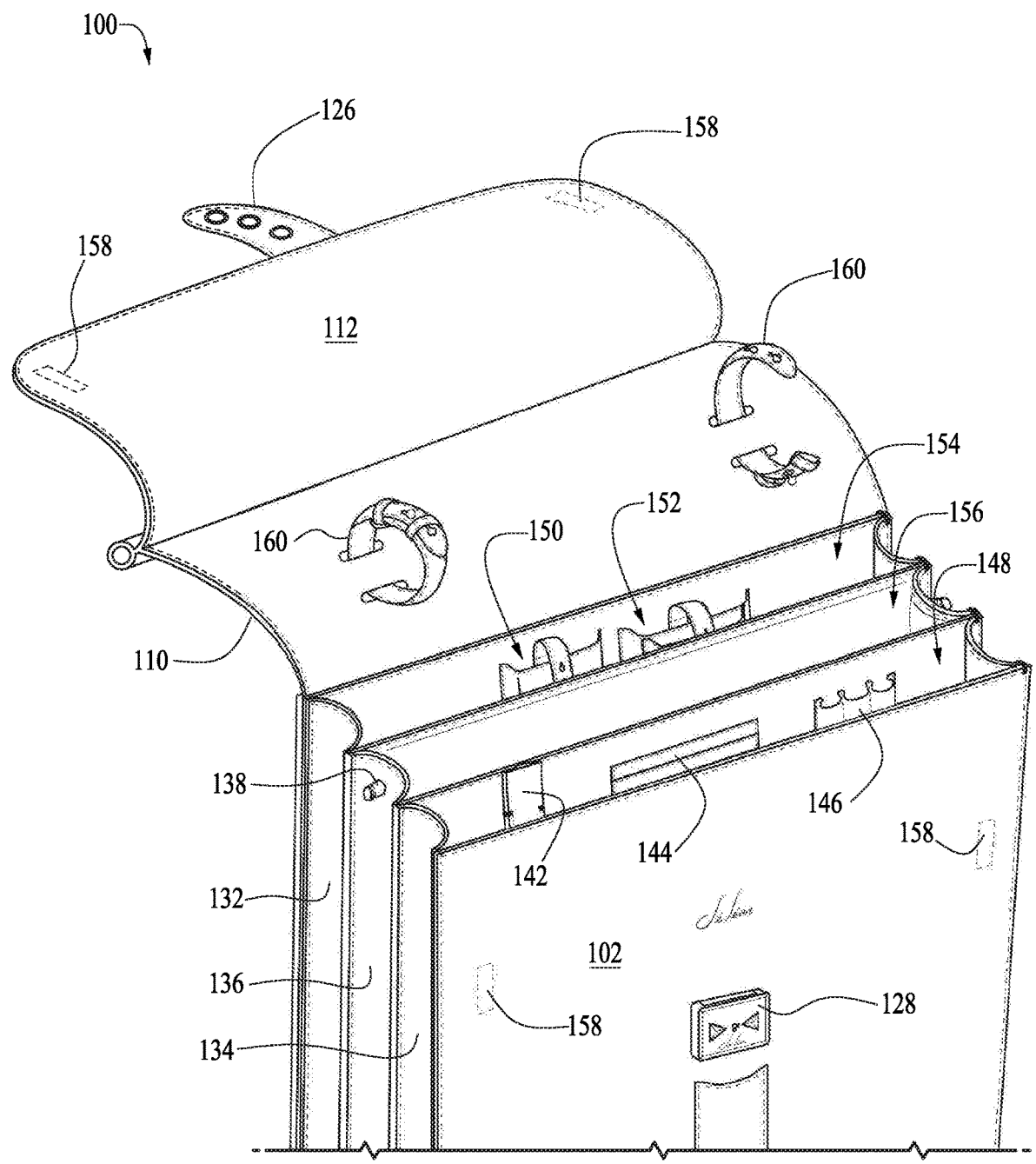
FIG. 3 illustrates a perspective view of the first container portion in a top-opened configuration.

Referring to FIG. 3, the first container portion 100 is shown with the first overlapping portion 110 opened, to reveal various internal components. In a preferred embodiment, the first container portion 100 includes briefcase features and includes a keychain holder 142, a wallet section 144 for credit or similar card storage, and a pen storage 146 for holding pens, stylus, or other similar implements. These features are preferably located in a first compartment 148 corresponding with the front pleat 134. The first container portion 100 also comprises one or more electronics pockets 150 for storing cell phones and similar personal electronics. The first container portion 100 also includes a dual pocket 152 that includes a first pocket for holding an electronic item, and a second pocket for holding an electronic item battery to wirelessly charge the electronic item. The electronics pockets 150 and the dual pocket 152 are preferably located in a third compartment 154. The third compartment 154 is sized to accommodate preferable miscellaneous items such as a phone, charger, etc. A second compartment 156 between the first compartment 148 and the third compartment 154 is sized to accommodate a laptop computer, similar electronics device, or documents. In a preferred embodiment, the first compartment 148, second compartment 156 and third compartment 154, or any combination thereof may have foam backing or be otherwise padded to ensure the safety of electronics and other items in the first container portion 100.

Still referring to FIG. 3, additional features of the first overlapping portion 110 include embedded magnetic closures 158 on the first flap 112 corresponding to complimentary embedded magnetic closures 158 on the first front side 102. The embedded magnetic closures 158 help to ensure the first flap 112 does not curl up at the edges when the first overlapping portion is secured using the first lock 128. Also on the first overlapping portion 110, a pair of umbrella straps 160 may be included for securing an umbrella or newspaper (not shown).

Figure 4:
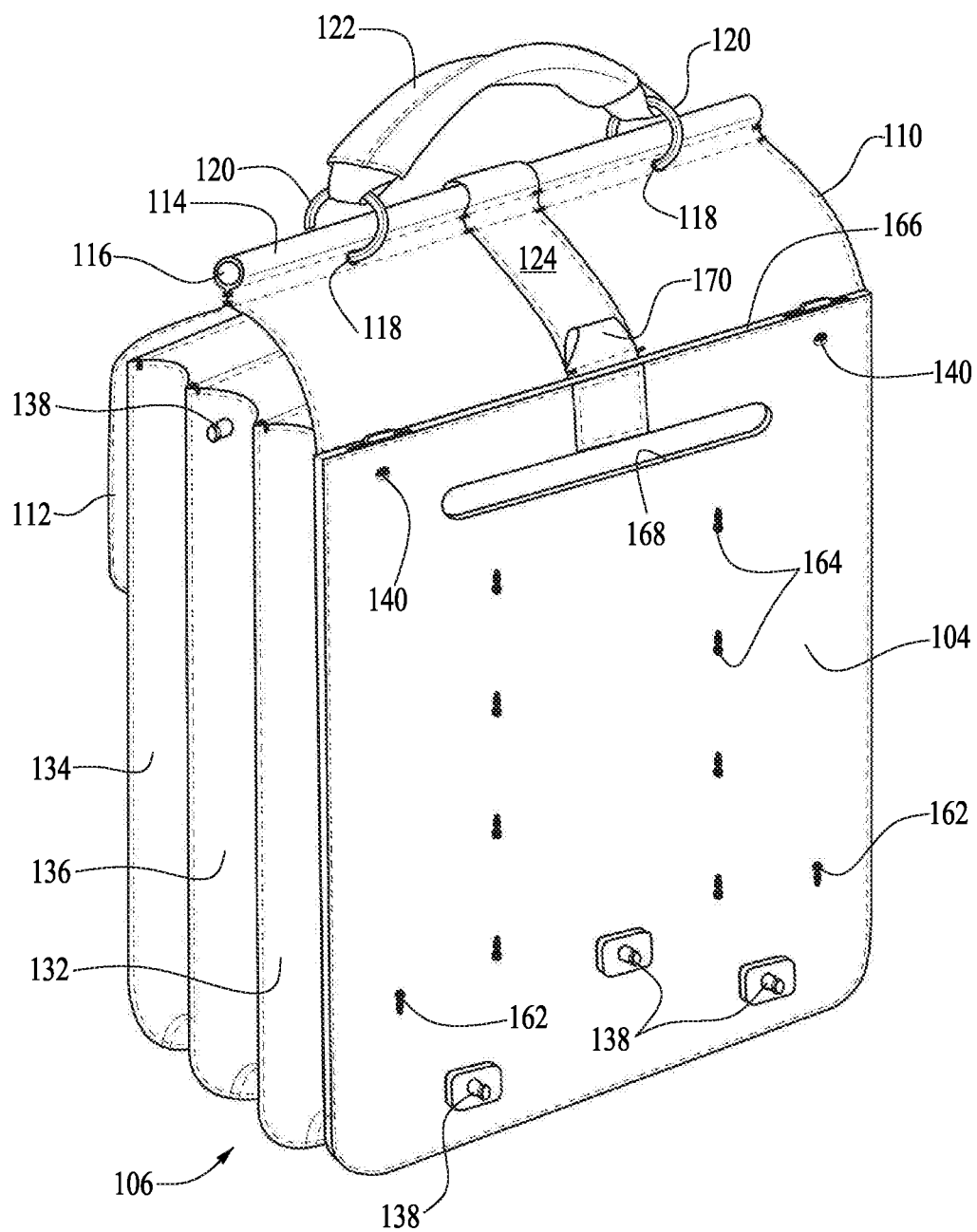
FIG. 4 illustrates a rear perspective view of the first container portion including the first back side.

Referring to FIG. 4, a rear view of the first container portion 100 is shown, including the first back side 104 with the first rear cover 108 (FIGS. 5A, 5B) removed or prior to installation. The first back side 104 includes two top female portion guillotine fasteners 140 for accommodating the first rear cover 108, with releases accessible atop the first back side 104. Two rear panel keyhole portions 162 of pin and keyhole or similar fasteners are included below the female portion guillotine connectors 140 for securing the first rear cover 108 over the first back side 104.

Still referring to FIG. 4, the first back side 104 also includes a series of harness keyhole portions 164 of pin and keyhole or similar fasteners arranged in parallel rows, thus enabling the shoulder harness 228 (FIGS. 10A and 10B) to be installed at a variety of heights on the first back side 104 according to preference. In a preferred embodiment, a series of three additional male portion guillotine connectors 138 are located near the bottom of the first back side 104 to accommodate complimentary female portion guillotine fasteners 140 on a shoulder strap 236 (FIG. 11). The male portion guillotine connectors 138 on the first back side 104 are preferably raised to account for the thickness of the first rear cover 108. In an alternate embodiment, two male portion guillotine connectors 138 are located on the first bottom side (not shown) adjacent the first back side 104, and one male portion guillotine connector 138 is present adjacent the bottom of the first back side 104 either in the middle, or to the right or the left of the first back side 104.

Still referring to FIG. 4, atop the first back side 104 a first upper slot 166 is disposed above a preferably larger first lower slot 168. The first upper slot 166 and first lower slot 168 are preferably substantially the same width, corresponding to the width of the shoulder harness 228, allowing the shoulder harness 228 to slide into the first upper slot 166, and out through the first lower slot 168 where it engages the harness keyhole portions 164 of the pin and keyhole fasteners prior to installation of the first rear cover 108. Also included above the first upper slot 166 and preferably incorporated into the first decorative strap 124, is a strap loop 170 designed to accommodate the shoulder strap 236 for configuring the first container portion 100 as a backpack or shoulder bag according to preference.

Figure 5B:
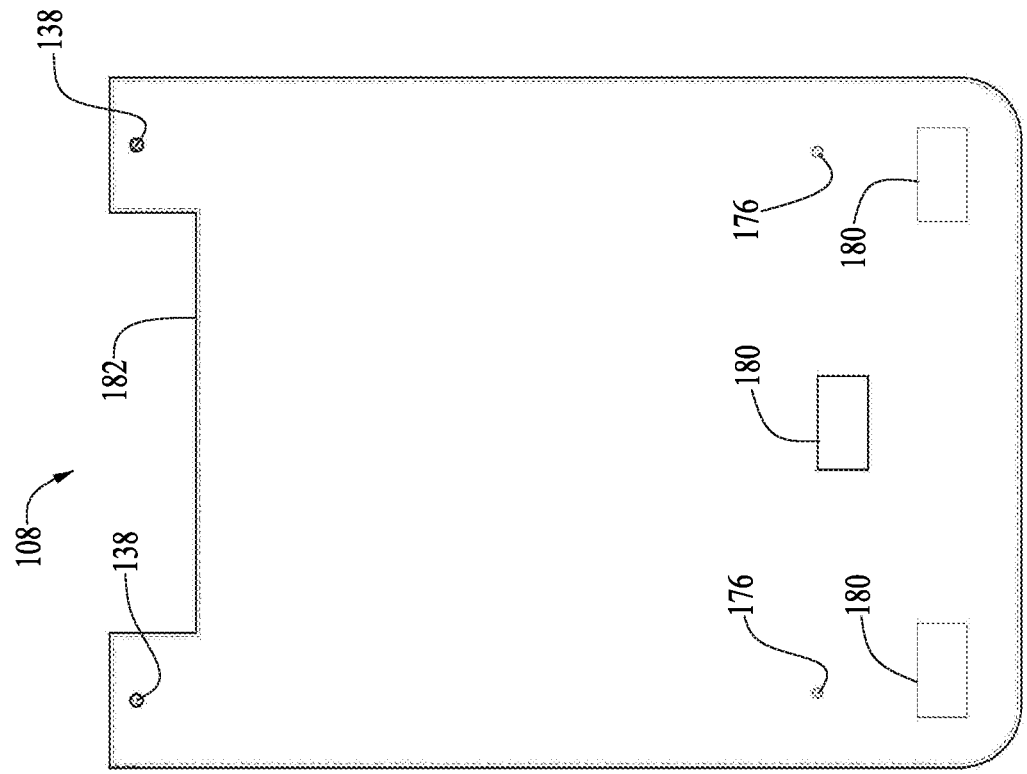
FIG. 5B illustrates a plan view of the back side of a rear cover of the apparatus.
Figure 5A:
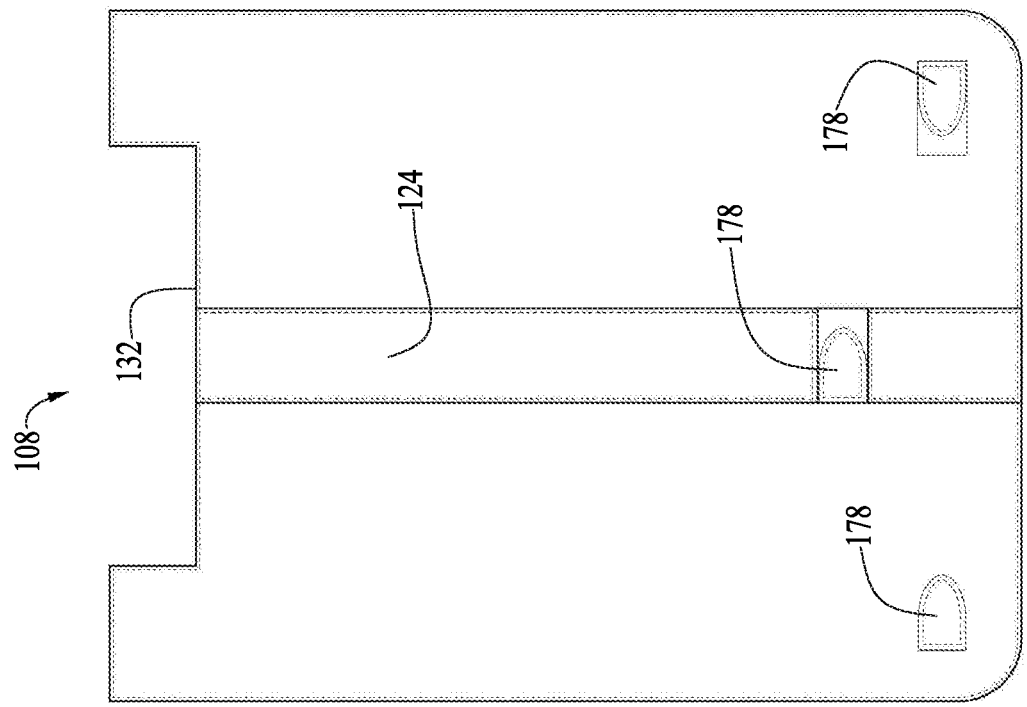
FIG. 5A illustrates a plan view of the front side of a rear cover of the apparatus.

Referring to FIGS. 5A and 5B, the front and rear, respectively, of the preferred embodiment of the first rear cover 108 is shown. The front (FIG. 5A) of the first rear cover 108 includes a portion of the first decorative strap 124 that conveys the appearance of it extending completely over the first container portion 100. Additionally, three first sliding doors 178 are provided for opening three first shoulder strap ports 180 (FIG. 5B) in order to access the male portion guillotine connectors 138 on the first back side 104 of the first container portion 100 when the first rear cover 108 is affixed thereto. In an alternate embodiment (not shown), only one first shoulder strap port 180 is present, and in a position to access the one male portion guillotine connector 138 on the first back side 104 of the alternate embodiment of the first container 100. At the top of the first rear cover 108, other male portion guillotine connectors 138 corresponding to the female portion guillotine connectors 140 of the first rear cover 108 are provided. Near the bottom of the first rear cover 108, above the first shoulder strap ports 180, rear panel pin portions 176 corresponding to the rear panel keyhole portions 162 (FIG. 4) are shown, thus the top of the first rear cover 108 is secured to the first back side 104 by a guillotine-type connector, while the bottom of the first rear cover 108 is secured to the first back side 104 by a pin and keyhole fastening system. Atop the first rear cover, a harness cutout 182 is provided for accommodating the shoulder harness 228.

Figure 6:
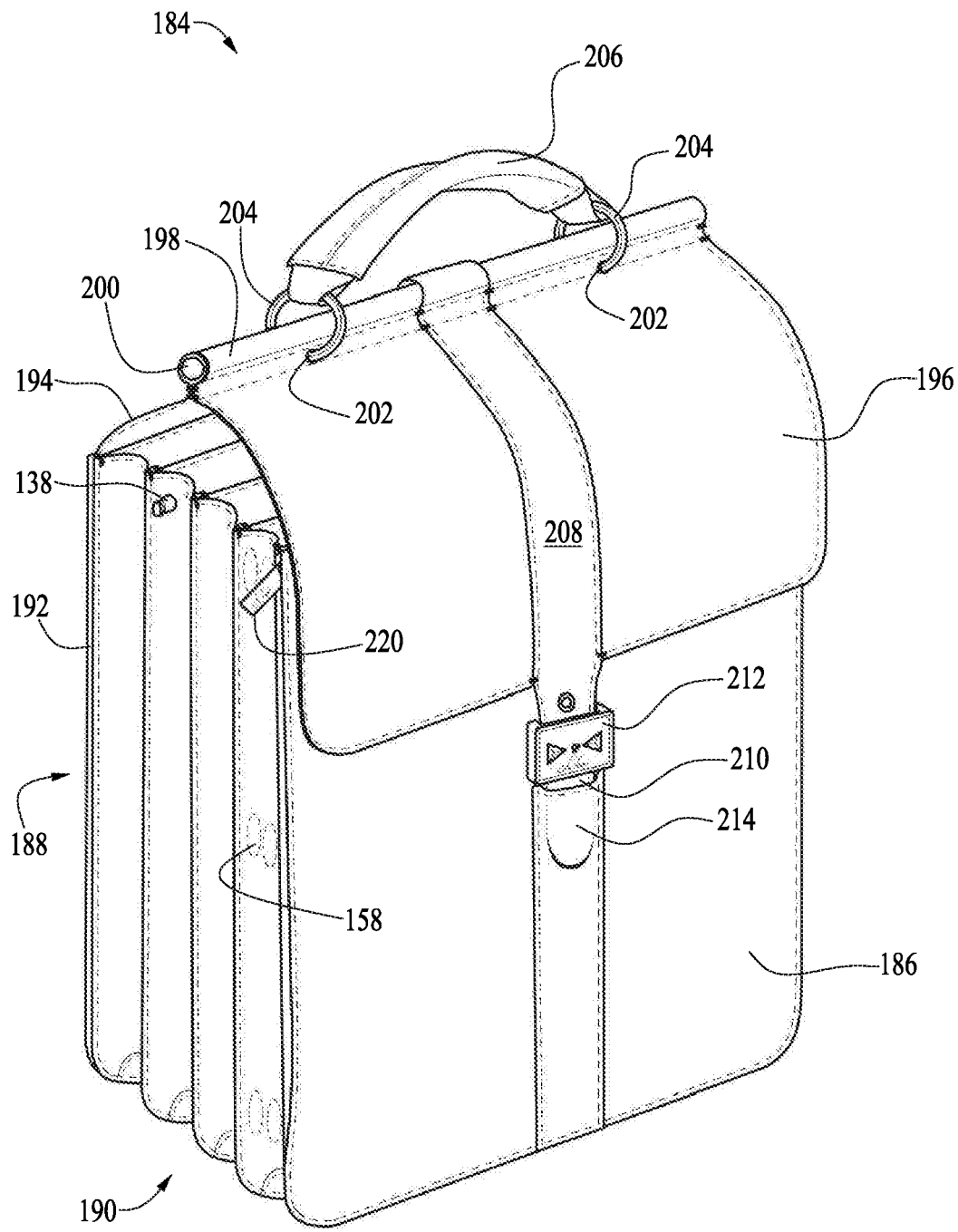
FIG. 6 illustrates a perspective view of a second container portion of the apparatus.

Referring to FIG. 6, the second container portion 184 is shown. The second container portion 184 is designed to match the first container portion 100, providing a matching appearance when the first container portion 100 and the second container portion 184 are connected together or joined by the shoulder harness 228. Like the first container portion 100, the second container portion 184 includes a second front side 186, a second back side 188, with a second pleated section 190 between them, and a second bottom side (not shown). The second container portion 184 has a second rear cover 192, substantially similar to the first rear cover 108, removably covering the second back side 188. A second overlapping portion 194 with a second flap 196 covers the second container portion 184. Also like the first container portion 100, the second overlapping portion 194 includes a second handle support 198 preferably enclosing a second dowel 200. Second handle anchor holes 202 accommodate second removable o-rings 204 that attach a removable second handle 206 to the second container portion 184.

Still referring to FIG. 6, the second container portion 184 includes a second decorative strap 208 that extends over the second overlapping portion 194, including the second flap 196, from the second back side 188 to the second front side 186, and is preferably centered on the second container portion 184. The second decorative strap 208 includes a second tongue 210 that overhangs the second flap 196, and engages a second lock 212 located on the second front side 186. Below the second lock 212, an extension of the second decorative strap 208 includes a second pocket 214 for accommodating excess of the second tongue 210 when it engages the second lock 212. Thus, in addition to imparting an aesthetically pleasing appearance to the second container portion 184, the second decorative strap 208 also serves to secure the second overlapping portion 194 to the second front side 186. As with the first container portion 100, the second lock 212 may be a traditional buckle, keyed lock, combination lock, or any other locking feature suitable for securing the second decorative strap 208. The second pocket 214 helps prevent the second tongue 210 from curling away from the second front side 186 when locked in position. The second container portion 184 also preferably includes a strap loop 170 (FIG. 9) similar in size and placement to the strap loop 170 of the first container portion 100.

Still referring to FIG. 6, the second pleated section 190 of the second container portion 184 is preferably slightly larger than the first pleated section 106 due, in part, to the configuration of the second container 184 as an overnight bag or similar overnight case. In the embodiment illustrated in FIGS. 2-4, the first pleated section 106 has only three gussets corresponding, to the first compartment 148, second compartment 156 and third compartment 154. In contrast, the second pleated section 190 has four gussets. In order to reduce the size of the second pleated section 190, in the event less storage space is needed, and to make the first container portion 100 and the second container portion 184 more similar in size, the second pleated section 190 includes one or more magnetic closures 158 to close one of the gussets. Like the first pleated section 106, the gussets of the second pleated section 190 are preferably all of equal size. Also like the first container portion 100, the second container portion preferably has male portion guillotine connectors 138 on either side of the second pleated section 190.

Figure 7:
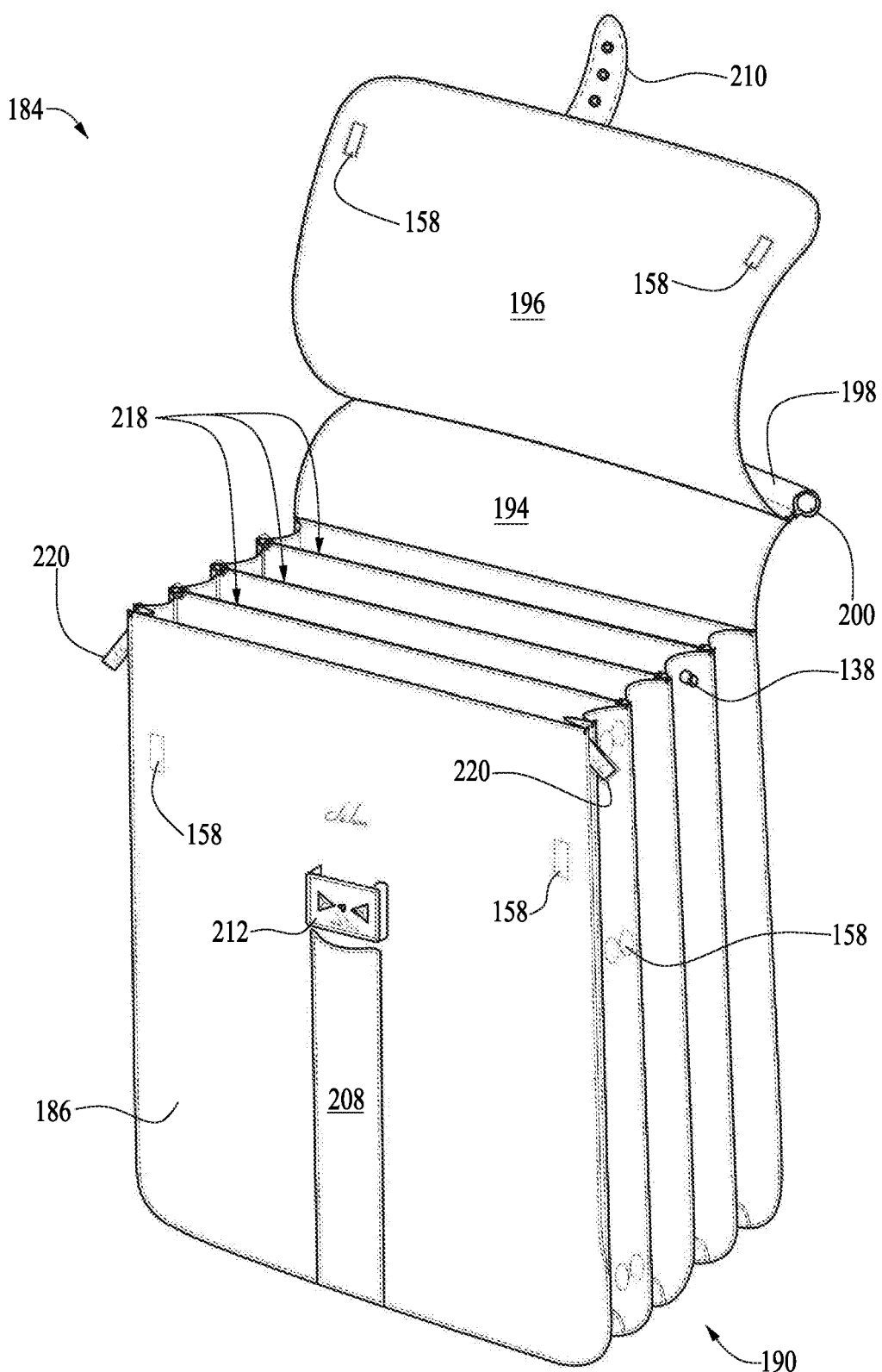
FIG. 7 illustrates a front perspective view of the second container portion in a top-opened configuration.

Referring to FIG. 7, the second container 184 is shown with the second decorative strap 208 unlocked and the second overlapping portion 194 lifted up. Extending between each of the gussets of the second pleated section 190 is a removable divider 218, one or more of which may be removed depending on the space needs of a user when packing. For example, a user traveling with very few clothes may close the magnetic closures 158 of the second pleated section 190 to reduce the size of the second container portion 184. Alternatively, a user traveling with many different clothing items, or bulky items, may remove one or more of the removable dividers 218 (and, according to preference, leave the magnetic closures 158 open) to accommodate the larger items.

Still referring to FIG. 7, the second container 184 also preferably includes a zipper closure 220 which allows the second front side 186 to be opened or partially opened, making it easier to access the interior. Like the first container portion 100, the second front side 186 and the second flap 196 of the second overlapping portion 194 of the second container portion 184, preferably include magnetic closures 158 for securing the second flap 196 when the second overlapping portion 194 is closed and the second decorative strap 208 is fastened using the second lock 212.

Figure 8:
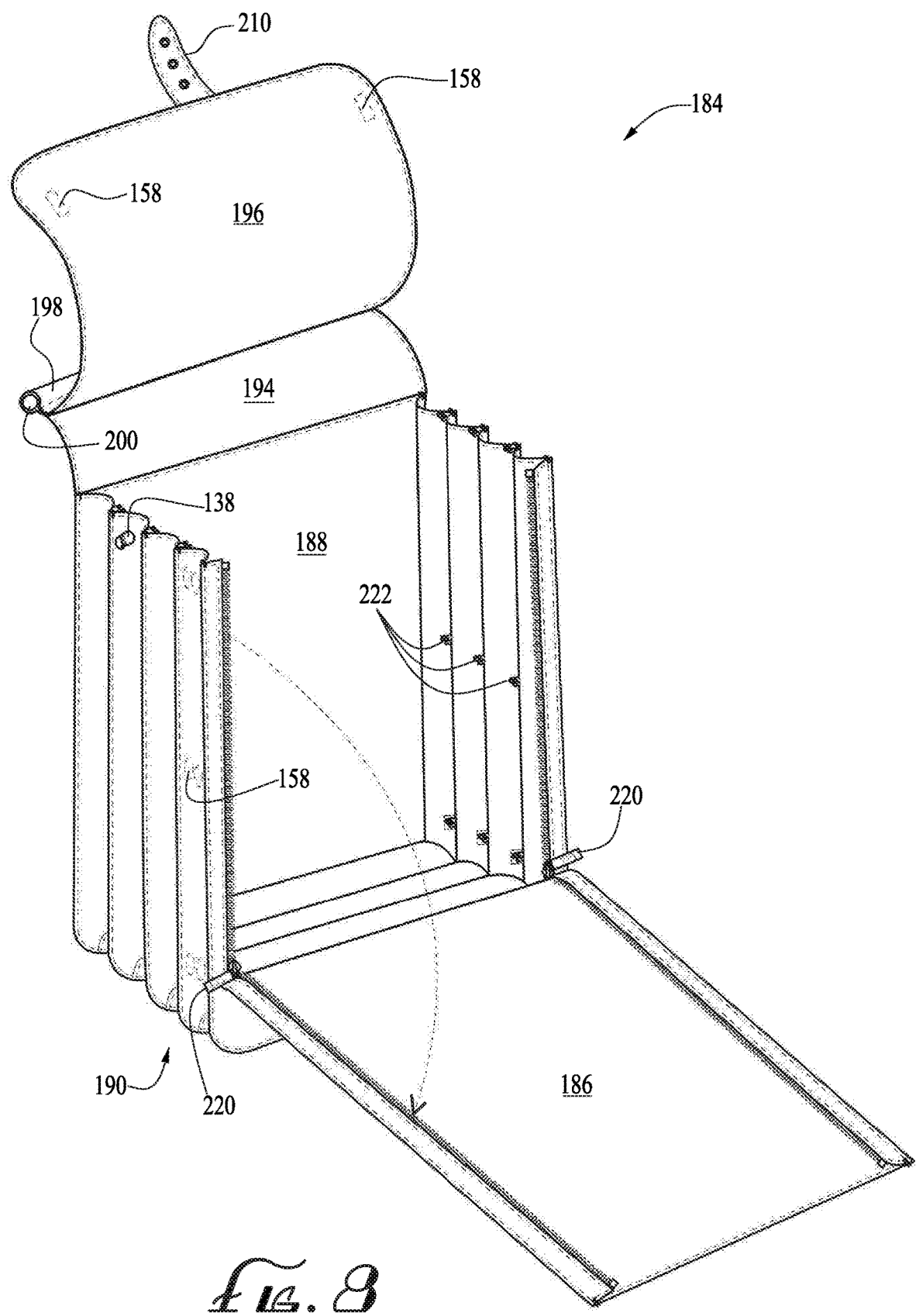
FIG. 8 illustrates a perspective view of the second container portion in a fully opened configuration.

Referring to FIG. 8, the second container 184 is shown in an open configuration with the second overlapping portion 194 opened, all removable dividers 218 (FIG. 7) removed, and with the zipper closures 220 opened and second front side 186 folded down to allow easy access to the interior of the second container portion 188 for packing. Preferably, the removable dividers 218 and the second front side 186 are substantially resilient, stiff panels, allowing them to resist pressure from clothing or other items (not shown) contained in the second container portion 184. Additionally, each of the gussets of the second pleated section 190 may comprise clasps 222 that serve as guides for the removable dividers 218 ensuring their proper fit in the second container portion 184.

Figure 9:
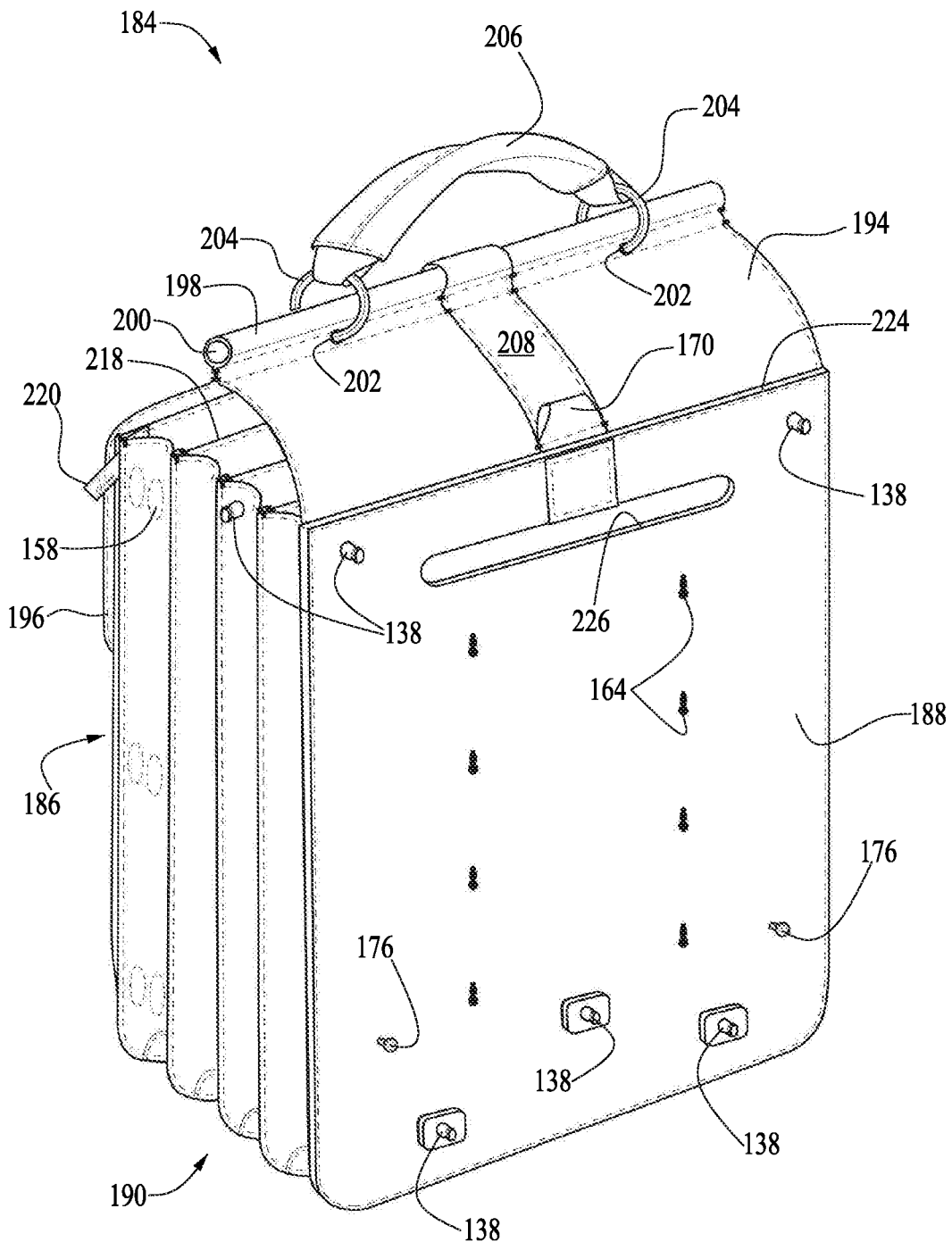
FIG. 9 illustrates a rear perspective view of the second container portion including the second back side.

Referring to FIG. 9, the second back side 188 is shown. The second back side 188 is somewhat similar to the first back side 104, although it includes male portion guillotine connectors 138 (instead of female portion guillotine connectors 140) near the top, and pin portions 176 (as opposed to rear panel keyhole portions 162) near the bottom, which allows the second back side 188 to be affixed to the first back side 104, and thus, allows the second container portion 184 to be affixed directly to the first container portion 100. Similar to the first back side 104, the second back side 188 includes a second upper slot 224 and a preferably larger second lower slot 226, in the same position as the first upper slot 166 and first lower slot 168. Also present are a series of harness keyhole portions 164 formed in substantially the same position so as to mirror the harness keyhole portions 164 of the first back side 104, enabling users to install the shoulder harness 228 in substantially the same position on the first container portion 100 relative to the second container portion 184 for symmetry.

Still referring to FIG. 9, the second back side 188 of the preferred embodiment of the second container 184 also includes three male portion guillotine connectors 138, proximate to the male portion guillotine connectors 138 of the first back side 104 (FIG. 4). In an alternate embodiment, two male portion guillotine connectors 138 are located on the second bottom side (not shown) adjacent the second back side 188, and one male portion guillotine connector 138 is present adjacent the bottom of the second back side 188 either in the middle, or to the right or the left of the second back side 188. The placement of the male portion guillotine connectors 138 of the preferred embodiments enables the second container portion 184 to be worn over the shoulder, and the placement of the male portion guillotine connectors 138 enables the second container 184 to be worn as a backpack in a manner similar to the first container portion 100 (see FIG. 13). Also shown in this view is the strap loop 170 located on the second decorative strap 208, used when the second container 184 is worn as a backpack. The preferred and alternate embodiment of the second rear cover (not shown) is provided for covering the second back side 188 and is virtually identical in appearance to the first rear cover 108, and includes all of the features of the first rear cover 108 (except it has female portion guillotine connectors 140 and rear panel keyhole portions 162 of the pin and keyhole connectors).

Figure 10A:
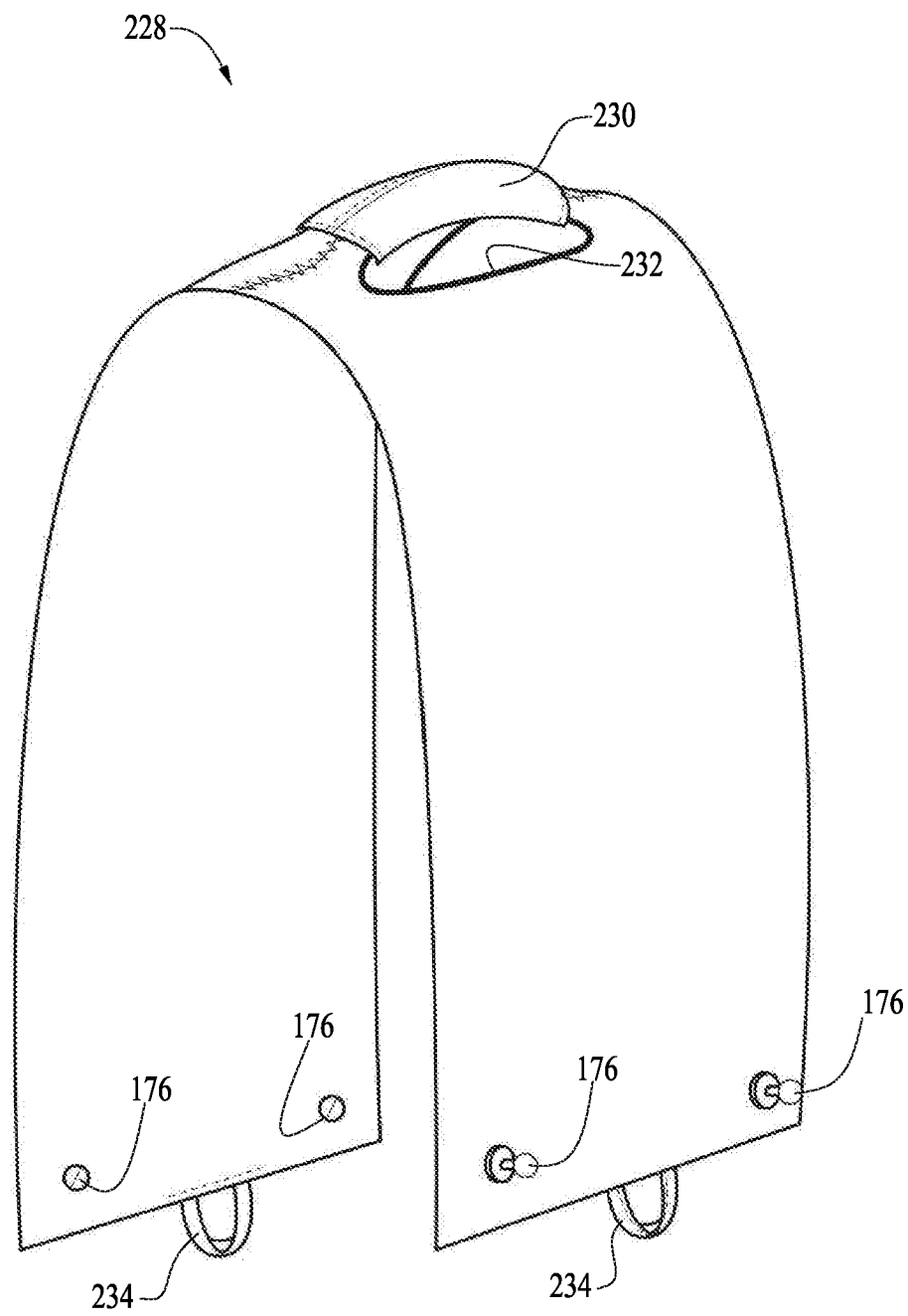
FIG. 10A illustrates a perspective view of the shoulder harness.
Figure 10B:
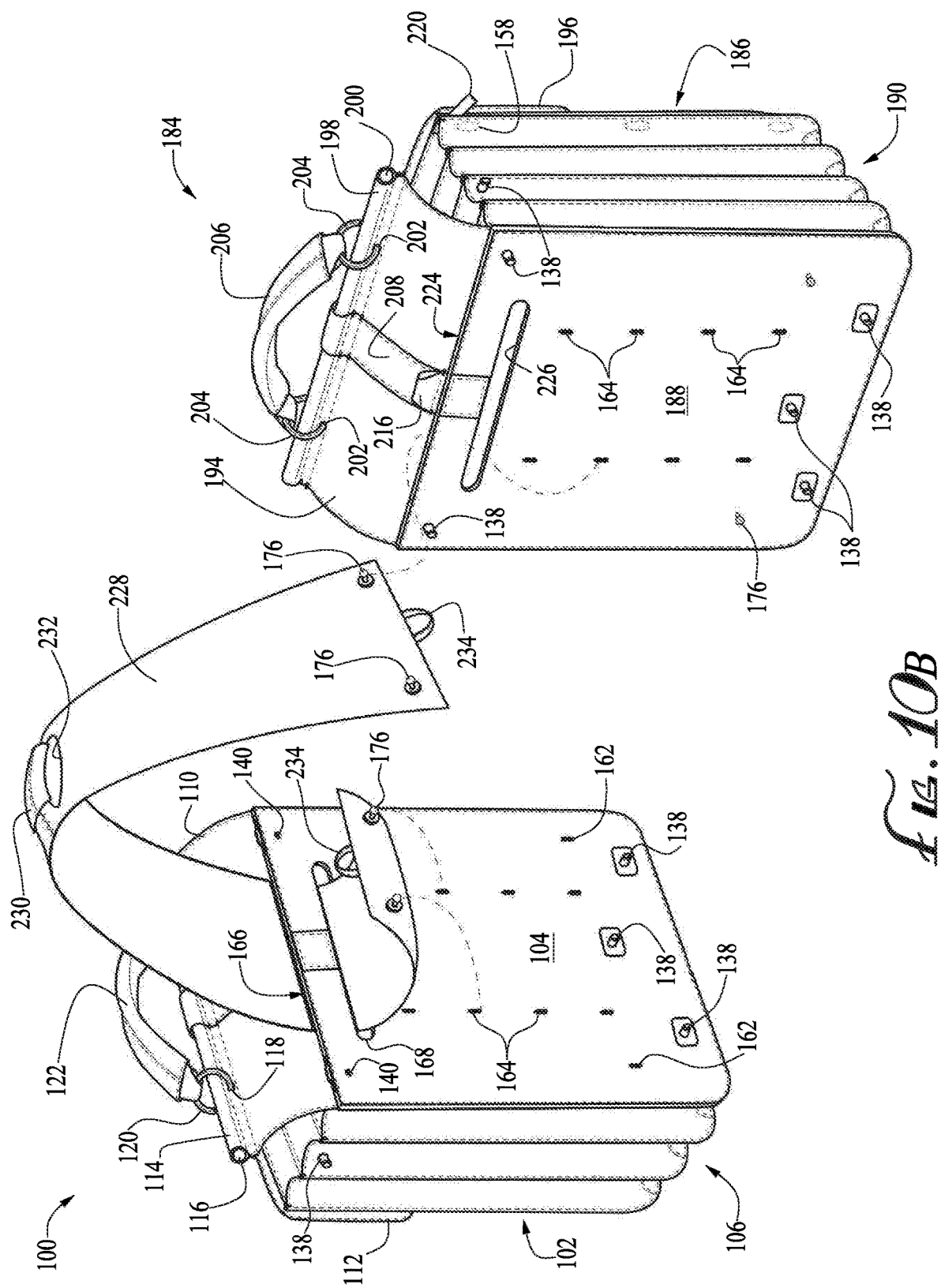
FIG. 10B illustrates a perspective view of the shoulder harness being installed on the first container portion and the second container portion.
Figure 11:
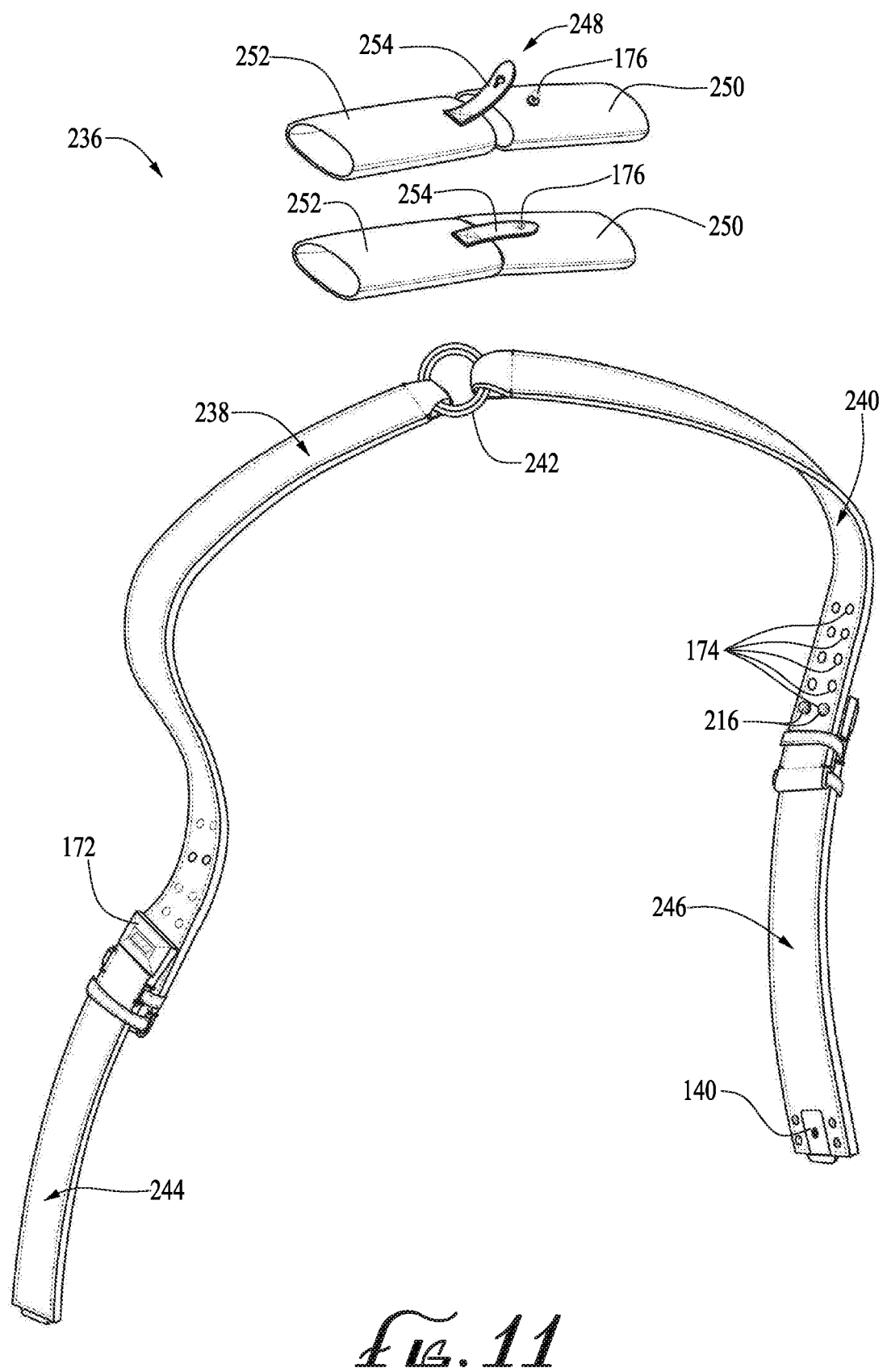
FIG. 11 illustrates the shoulder strap and the shoulder strap sleeve for covering the shoulder strap.

Referring to FIGS. 10A and 10B, the shoulder harness 228 is shown by itself and in the process of installation, respectively. Referring to FIG. 10A, the shoulder harness 228 is preferably an elongated rectangular piece, with a shoulder harness handle 230 preferably located at its midsection. The shoulder harness 228 is also preferably backed with foam or a similar cushioning material allowing a user to comfortably wear the shoulder harness 228 with the first container portion 100 and the second container portion 184 attached thereto. The shoulder harness handle 230 is preferably defined by two cutout portions 232 on either side, and is preferably curved upward to foster a firm grip by the user. At either end of the shoulder harness 228, the pin portions 176 of the pin and keyhole fasteners are located. Preferably two pair of pin portions 176 are provided for affixing to a row of harness keyhole portions 164 on the first back side 104 and a row of harness keyhole portions 164 on the second back side 188. Extending from either end of the shoulder harness 228 are flat loops 234 that allow the shoulder harness 228 to be anchored to other structures, for example when attached to a motorcycle as a saddlebag.

Referring to FIG. 10B, the shoulder harness 228 is shown being installed on the first container portion 100. The shoulder harness 228 is inserted into the first upper slot 166 so that it comes out of the first lower slot 168. The shoulder harness 228 can be pulled out of the first lower slot 168 sufficiently to anchor the pin portions 176 in the harness keyhole portions 164 at a preferred height on the first back side 104. The shoulder harness 228 is installed on the second container portion 184 in the same manner, and preferably on corresponding harness keyhole portions 164 for a balanced appearance, although other configurations are possible according to preference. With the shoulder harness 228 attached to the first container portion 100 and the second container portion 184, both can be carried with ease using the shoulder harness 228 over a user's shoulder, and can be picked up from a standing location using the shoulder harness handle 230.

Referring to FIG. 11, when either the first container portion 100 or the second container portion 184 are desired to be used independently, a shoulder strap 236 may be employed. The shoulder strap 236 is preferably comprised of a first main strap portion 238 and a second main strap portion 240, connected by a removable o-ring 242. The first main strap portion 238 and the second main strap portion 240 are comprised of shoulder strap holes 174 in varying positions along the length of each portion. A first strap extension 244 extends from the first main strap portion 238 and a second strap extension 246 extends from the second main strap portion 240. The first strap extension 244 and second strap extension 246 are preferably fitted with shoulder strap adjustment hardware 172 comprised of shoulder strap extension pins 216. The shoulder strap extension pins 216 have a preferable flat end, and connect with the first main strap portion 238 and second main strap portion 240 by inserting the shoulder strap extension pins 216 into the shoulder strap holes 174 to allow the shoulder strap 236 to be easily shortened or lengthened while still connected to either the first container portion 100 or the second container portion 184. Opposite their connection to the first main strap portion 238 and the second main strap portion 240, the first strap extension 244 and the second strap extension 246 are preferably fitted with female portion guillotine connectors 140 and are thus connectable to the male portion guillotine connectors 138 on the first pleated side 106, second pleated side 190, first back side 104 and second back side 188.

Still referring to FIG. 11, an accompanying part of the shoulder strap 236 is a shoulder strap sleeve 248, comprising a first sleeve portion 250 and a second sleeve portion 252 connected by a shoulder sleeve fastener 254. When connected, the first sleeve portion 250 and the second sleeve portion 252 preferably cover the removable o-ring 242, thus shielding a user's shoulder from contact with it. When the shoulder strap 236 is reconfigured as two backpack straps, the shoulder sleeve fastener 254 allows the first sleeve portion 250 and the second sleeve portion 252 to be separated, thus allowing the removable strap o-ring 242 to connect to the strap loop 170 on either the first container portion 100 or the second container portion 184. Preferably the shoulder strap sleeve 248 is sufficiently padded, such that it is comfortable when worn, even supporting the weight of the first container portion 100 or the second container portion 184.

Figure 12:
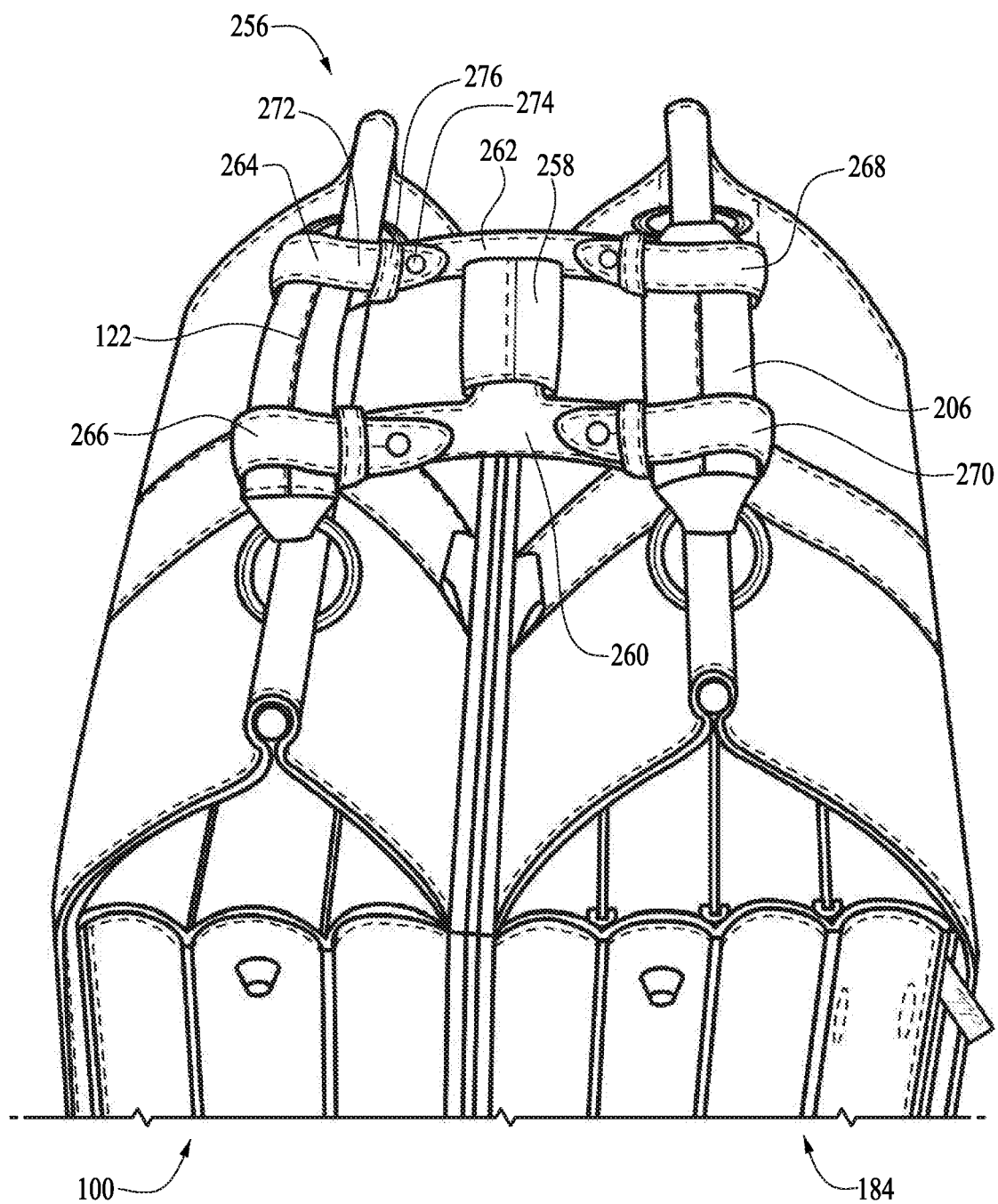
FIG. 12 illustrates a perspective view of a handle extension attached to the first container and second container.

Referring to FIG. 12, as an alternative to the shoulder harness 228, a handle extension 256 may be provided for carrying the first container portion 100 and the second container portion 184, in either a connected or disconnected arrangement, without using the shoulder harness 228, or the shoulder strap 236. The handle extension 256 includes a handle portion 258 connected to a first connecting portion 260 and a second connecting portion 262. The first connecting portion 260 and the second connecting portion 262 span the distance between the first handle 122 and the second handle 206, connecting thereto by means of a first forward connecting loop 264 and a first rear connecting loop 266, each affixed the first handle 122 on the first container 100, and a second forward connecting loop 268 and a second rear connecting loop 270, each affixed to the second handle 206. Preferably the first forward connecting loop 264, first rear connecting loop 266, second forward connecting loop 268, and second rear connecting loop 270 are affixed using a connecting loop strap 272 and stud 274 arrangement whereby each connecting loop strap 272 is looped around the first handle 122 (or, alternatively, the second handle 206), and is passed through a retaining loop 276 which helps confine the connecting loop strap 272 on each stud 274.

Still referring to FIG. 12, the male guillotine connectors 138 of the first back side 104 (FIG. 4) are staggered in relation to the male guillotine connectors 138 of the second back side 188 (FIG. 9), thereby preventing contact and enabling the first container 100 and second container 184 to remain in close proximity when in a connected arrangement.

Figure 13:
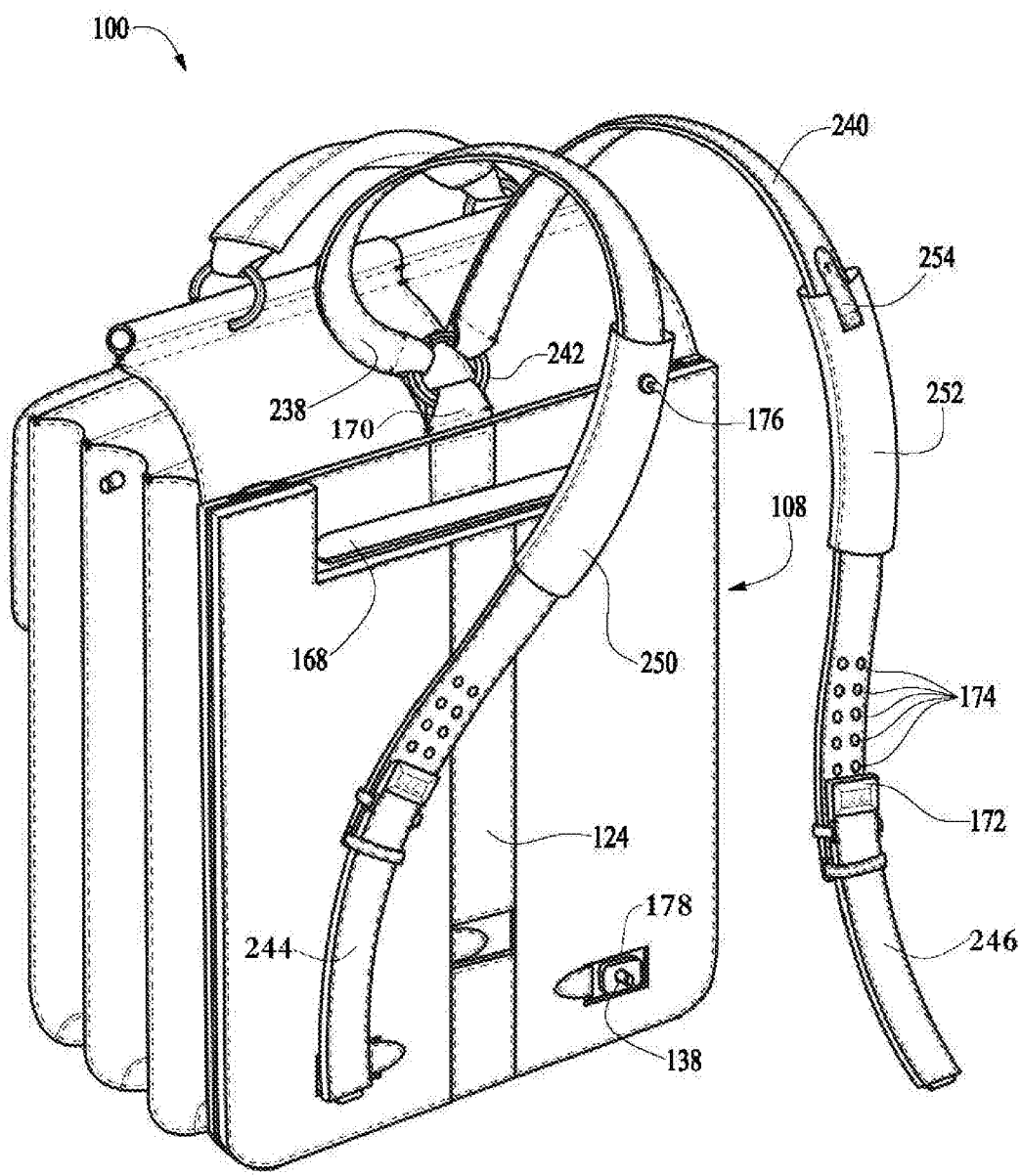
FIG. 13 illustrates a rear perspective view of the first container portion in a backpack configuration.

Referring to FIG. 13, the first container 100 is shown in a backpack configuration. In this configuration, the first rear cover 108 is attached to the first back side 104 and the shoulder strap 236 is connected to the first container 100, looping the removable o-ring 242 into the strap loop 170. In the preferred embodiment of the first container 100, the first strap extension 244 is connected to the first back side 104 by opening the first sliding door 178 of the first rear cover 108 and inserting the male portion guillotine connector 138 of the first back side 104 into the female portion guillotine connector 140 of the first strap extension 244.

The structure of the apparatus 10 having been shown and described, its method of operation will now be discussed.

The apparatus 10 can be assembled in a variety of orientations, depending on the user preference. For purposes of discussion each assembly is described as though the apparatus 10 is assembled from a fully disassembled configuration.

The primary configuration of the apparatus 10 is for use as a saddlebag or over-the-shoulder bag, in which both the first container portion 100 and the second container portion 184 are in use. In order to use the apparatus 10, a user obtains the first container portion 100, disengages the first lock 128, and opens the first flap 112 to expose the first compartment 148, second compartment 156, and third compartment 154. In the first compartment 148, the user may connect the user's keys (not shown) to the keychain holder 142, insert one or more credit cards or credit card-shaped cards into the wallet section 144, and insert one or more pens, pencils or stylus in the pen storage 146. In the second compartment 154, the user may place a cell phone (not shown) into the electronics pocket 150, and optionally may place an extra cell phone battery (not shown) in the dual pocket 152. Papers and other documents (not shown) may be inserted in the third compartment 156, and optionally, in the first compartment 148 and second compartment 154 to the extent there is room to accommodate them. During this process the rear pleat 132, front pleat 134 and center pleat 136 may expand as necessary depending on the volume of objects stored in the first container portion 100. Additionally, a user may insert a folded umbrella or newspaper (not shown) through the umbrella straps 160 to be held securely therein.

Once all desired contents are loaded in the open first container portion 100, the first flap 112 is closed over the top of the first container portion and the first decorative strap 124 anchored to the first lock 128, the magnetic closures 158 on the first flap 112 will hold it against the first front side 102 to prevent the sides of the first flap 112 from curling up. The user then installs clothing or similar items into the second container portion 184.

The second container portion 184 opens in a manner similar to the first container portion 100, except that once the second decorative strap 208 has been released from the second lock 212, and the second flap 196 folded back, the zipper closure 220 may be opened, allowing the second front side 186 to fold down and permit easier access to the interior of the second container portion 184. With the second container portion 184 opened, a user may install or remove one or more of the removable dividers 218 for effectively separating different types of clothing items (not shown). If a large quantity of clothing items are stored in the second container portion 184, the second pleated section will expand to accommodate them. If, on the other hand, only a few clothing items are stored in the second container portion 184, the second pleated section 190 can be reduced in size by bringing the magnetic closures 158 in the pleated section 190 together. Once the clothing items are fully installed in the second container portion 184, the zipper closure 220 can be closed, and the second flap 196 folded back over the top of the second container portion 184. Similar to the first container portion 100, the second tongue 210 is secured using the second lock, and the magnetic closures 158 on the second flap 196 and the second front side 186 couple together.

With the first container 100 and the second container 184 holding their respective items, and their closures locked in position, the apparatus 10 can be assembled for transport. To fully assemble the apparatus 10, the shoulder harness 228 is attached to the first back side 104 and the second back side 188 by inserting the pin portions of the shoulder harness 228 into the harness keyhole portions 164 of the first back side 104 and the second back side 188. Preferably placement of the pin portions 176 will be on the same row of harness keyhole portions 164 for even distribution of the weight of the apparatus 10. The shoulder harness 228 extends through the first upper slot 166 and first lower slot 168 on the first container portion 100 and extends through the second upper slot 224 and the second lower slot 226 on the second container portion 184. The upper slots 166/224 and the lower slots 168/226 help anchor the shoulder harness 228 near the top of the first container 100 and the second container 184, respectively.

Once the shoulder harness 228 is installed, the first rear cover 108 is installed over the first back side 104 and the second rear cover 192 is installed over the second back side 188. This is accomplished by inserting the pin portions 176 located on the first rear cover 192 into the rear panel keyhole portions 162 located on the first back side 104 and anchoring the male portion guillotine connectors on the first back side 104 into the female portion guillotine connectors 140 of the first rear cover 108. While the second rear cover 192 attaches to the second back side 188 in a similar fashion, it should be noted that the male portion guillotine connectors 138, female portion guillotine connectors 140, harness keyhole portions 164, and pin portions 176 are reversed, thus allowing the first back side 104 to connect to the second back side 188 if desired.

With the first rear cover 108 and second rear cover 192 installed over the shoulder harness 228, the apparatus can be worn on a user's shoulder or installed similar to a set of saddlebags on a motorcycle or other similar location. When worn on a user's shoulder, the shoulder strap 236 is preferably also employed to prevent the apparatus 10 from slipping. The shoulder strap 236 preferably anchors to the center male portion guillotine connector 138 on the first back side 104 and the second back side 188, and are accessed through the middle sliding doors 178 of the first rear cover 108 and the second rear cover 192.

The apparatus 10 may also be reconfigured in several different ways for alternative uses. As discussed by omitting the first rear cover 108 and the second rear cover 192, the first container portion 100 can be connected directly to the second container portion 184 to function as one large apparatus 10. Alternatively, the first container portion 100 or the second container portion 184 may be worn either over the shoulder or as a backpack.

For the over-the-shoulder configuration, the shoulder strap 236 is attached to a male portion guillotine connector on either the first pleated section 106 or the second pleated section 190, and also attached to one of the side male portion guillotine connectors 138 on the first back side 104 or second back side 188, as discussed above, through the sliding doors 178 of the first rear cover 108 or second rear cover 192.

For the backpack configuration in the preferred embodiment of the first container 100, the second strap extension 246 is connected to the first back side 104 by opening the opposite first sliding door 178 of the first rear cover 108 and inserting the male portion guillotine connector 138 of the first back side 104 into the female portion guillotine connector 140 of the second strap extension 246. In the alternate embodiment of the first container 100, the first strap extension 244 is connected to the first back side 104 by inserting the male portion guillotine connector 138 of the first bottom side (not shown) adjacent the first back side 104 into the female portion guillotine connector 140 of the first strap extension 244. The second strap extension 246 is connected to the first bottom side (not shown) inserting the male portion guillotine connector 138 of the first bottom side (not shown) adjacent the first back side 104 into the female portion guillotine connector 140 of the second strap extension 246. The shoulder strap 236 adjusts to a user's desired length by inserting the shoulder strap extension pins 216 into the selected shoulder strap holes 174. The shoulder strap sleeve 248 may be disconnected into the first sleeve portion 250 and the second sleeve portion 252 to provide padding for a user's shoulders.

The second container portion 184 and second back side 188 are substantially similar to the first container portion 100 and first back side 104, and likewise converts into a backpack configuration by attaching the second rear cover 192 to the second back side 188, connecting the removable o-ring 242 of the shoulder strap 236 to the strap loop 170, and connecting the first strap extension 244 and second strap extension 246 to male portion guillotine connectors 138.

In addition to these configurations, the first container portion 100 and the second container portion 184 may also be used separately without either the shoulder harness 228 or the shoulder strap 236, in which case they may be simply carried by the first handle 122 or the second handle 206 according to preference.

The embodiments disclosed may be made in various shapes, sizes, and materials. The soft-shell design shown and described could be constructed in hard-shell form made from various other materials including metals, and either design may have features such as being puncture or bullet proof, magnetically-attachable parts, a weapons compartment, leak proof and able to float, etc. Further, either design could include electronics such as satellite communications and GPS capability, built-in computer or other wireless devices, batteries, inductive or solar charging, and the like.

While particular forms of the invention have been illustrated and described, it will also be apparent to those skilled in the art that various modifications can be made without departing from the spirit and scope of the invention. Accordingly, it is not intended that the invention be limited except by the appended claims.

Insofar as the description above and the accompanying drawings disclose any additional subject matter that is not within the scope of the claims below, the inventions are not dedicated to the public and the right to file one or more applications to claim such additional inventions is reserved.

What is claimed is:

1. A luggage assembly comprising:
    a first bag and a second bag each having a front side and a rear side and a pair of opposing intermediate sides therebetween, the rear side of the first bag having a first one or more fasteners configured to engage a second one or more fasteners on the rear side of the second bag;
    each of the first bag and the second bag are configured to receive and connect with a dual bag strap extending between the first bag and the second bag, such that the first bag and the second bag may be separated and the luggage assembly used as saddlebags;
    the bags each further having a bag carrying handle and the luggage assembly further having an assembly carrying handle extending between the bag carrying handles, such that the rear sides of the bags may be fastened together and the luggage assembly conveniently carried by the assembly carrying handle;
    the luggage assembly further having an individual bag strap attachable to each of the bags for purposes of carrying the bags individually; and
    wherein the dual bag strap is attachable to the rear sides of the bags by the first and second one or more fasteners.

2. The luggage assembly of claim 1 wherein a middle portion of the dual bag strap has a strap carrying handle.

3. A luggage assembly comprising:
    a first bag and a second bag each having a front side and a rear side and a pair of opposing intermediate sides therebetween, the rear side of the first bag having a first one or more fasteners configured to engage a second one or more fasteners on the rear side of the second bag;
    each of the first bag and the second bag are configured to receive and connect with a dual bag strap extending between the first bag and the second bag, such that the first bag and the second bag may be separated and the luggage assembly used as saddlebags;
    the bags each further having a bag carrying handle and the luggage assembly further having an assembly carrying handle extending between the bag carrying handles, such that the rear sides of the bags may be fastened together and the luggage assembly conveniently carried by the assembly carrying handle;
    the luggage assembly further having an individual bag strap attachable to each of the bags for purposes of carrying the bags individually; and
    wherein the intermediate sides are pleated as to be collapsible.

4. A baggage system for carrying items, the baggage system comprising:
    a briefcase and a garment bag each having a back side, wherein the back sides have one or more saddle bag fasteners along the back sides and attachable to a saddle bag strap, the back sides further having a carrying strap fastener attachable to a single bag carrying strap; and
    the back sides further having an opening dimensionally compatible with the saddle bag strap, wherein the saddle bag strap may pass through the openings and extends between the briefcase and the garment bag.

5. The baggage system of claim 4 wherein the attachment of the saddle bag strap to the saddle bag fasteners is adjustable along a length of the back sides as to adjust a distance between the briefcase and the garment bag when the briefcase and the garment bag are attached to the saddle bag strap.

6. The baggage system of claim 4, wherein the briefcase and the garment bag further include parallel sides defining a width, and wherein the single bag carrying strap is attachable to the parallel sides such that the briefcase and the garment bag may be carried separately.

7. The baggage system of claim 4, wherein the briefcase and the garment bag further comprise a bottom side including one or more carrying strap fasteners.

8. The baggage system of claim 7, wherein the single bag carrying strap has a first end, a second end and a middle portion, the middle portion including a hardware attachable to the briefcase and the garment bag, and wherein the first end and the second end are attachable to the carrying strap fasteners on the briefcase and the garment bag, such that the briefcase and the garment bag may be worn separately as a backpack.

9. The baggage system of claim 4, wherein the single bag carrying strap has a first end, a second end and a middle portion, the middle portion including a hardware attachable to the briefcase and the garment bag, and wherein the first end and the second end are attachable to the carrying strap fasteners of the briefcase and the garment bag, such that the briefcase and the garment bag may be worn separately as a backpack.

10. The baggage system of claim 4, wherein the back sides further have a pair of cover fasteners attachable to a cover, wherein the cover conceals the saddle bag fasteners, the carrying strap fasteners, and the cover fasteners.

* * * * *